United States Patent
Wenig et al.

(10) Patent No.: US 8,949,406 B2
(45) Date of Patent: *Feb. 3, 2015

(54) METHOD AND SYSTEM FOR COMMUNICATION BETWEEN A CLIENT SYSTEM AND A SERVER SYSTEM

(75) Inventors: Robert Wenig, Mill Valley, CA (US); Ted Knudsen, San Rafael, CA (US)

(73) Assignee: International Business Machines Corporation, Armonk, NY (US)

( * ) Notice: Subject to any disclaimer, the term of this patent is extended or adjusted under 35 U.S.C. 154(b) by 1193 days.

This patent is subject to a terminal disclaimer.

(21) Appl. No.: 12/191,585

(22) Filed: Aug. 14, 2008

(65) Prior Publication Data
US 2010/0042573 A1 Feb. 18, 2010

(51) Int. Cl.
| | |
|---|---|
| *G06F 15/173* | (2006.01) |
| *G06F 9/54* | (2006.01) |
| *H04L 29/08* | (2006.01) |
| *H04L 29/06* | (2006.01) |

(52) U.S. Cl.
CPC .............. *G06F 9/54* (2013.01); *H04L 67/025* (2013.01); *H04L 29/06* (2013.01)
USPC .......................................... 709/224; 709/203

(58) Field of Classification Search
CPC ............ H04L 67/025; G06F 17/30014; G06F 17/542
USPC .......................................... 709/249, 224, 203
See application file for complete search history.

(56) References Cited

U.S. PATENT DOCUMENTS

| | | | |
|---|---|---|---|
| 5,463,547 | A | 10/1995 | Markowitz |
| 5,564,043 | A | 10/1996 | Siefert |
| 5,577,254 | A | 11/1996 | Gilbert |
| 5,699,526 | A | 12/1997 | Siefert |

(Continued)

FOREIGN PATENT DOCUMENTS

| | | |
|---|---|---|
| CA | 2656539 | 2/2008 |
| CA | 2696884 | 3/2009 |

(Continued)

OTHER PUBLICATIONS

Lubarsky, How to Delete Cookie Using Javascript, Aug. 19, 2007 http://web.archive.org/web/20070819123555/http://blogs.x2line.com/al/articles/316.aspx.*

(Continued)

*Primary Examiner* — Joseph E Avellino
*Assistant Examiner* — James Conaway
(74) *Attorney, Agent, or Firm* — Stolowitz Ford Cowger LLC

(57) ABSTRACT

A method of a server system communicating with a client system. The method includes a passive system monitoring network traffic between the client-server system. The server sending a page response including an agent, e.g., a Javascript that becomes operable on the client system. The agent monitors events on the client side, e.g., DOM events, and communicates these to the server side. A set of rules that define prescribed user events are maintained by the passive system and applied to the monitored network traffic to determine whether a prescribed user event occurred. Responsive to the prescribed user event occurring, an asynchronous message is generated and sent to the agent in response to a received DOM event message, the asynchronous message comprising a command to be executed by the agent to alter the users web application flow at the client in a manner that is substantially transparent to the web application.

20 Claims, 9 Drawing Sheets

(56) References Cited

U.S. PATENT DOCUMENTS

| | | | |
|---|---|---|---|
| 5,715,314 A | 2/1998 | Payne et al. | |
| 5,717,879 A | 2/1998 | Moran et al. | |
| 5,721,906 A | 2/1998 | Siefert | |
| 5,751,962 A | 5/1998 | Fanshier et al. | |
| 5,774,552 A | 6/1998 | Grimmer | |
| 5,781,735 A | 7/1998 | Southard | |
| 5,809,250 A | 9/1998 | Kisor | |
| 5,825,880 A | 10/1998 | Sudia | |
| 5,832,458 A | 11/1998 | Jones | |
| 5,832,496 A | 11/1998 | Anand et al. | |
| 5,845,124 A | 12/1998 | Berman | |
| 5,848,396 A | 12/1998 | Gerace | |
| 5,848,412 A | 12/1998 | Rowland | |
| 5,857,188 A | 1/1999 | Douglas | |
| 5,867,578 A | 2/1999 | Brickell | |
| 5,870,559 A | 2/1999 | Leshem et al. | |
| 5,894,516 A | 4/1999 | Brandenburg | |
| 5,903,652 A | 5/1999 | Mital | |
| 5,905,868 A | 5/1999 | Baghai et al. | |
| 5,909,492 A | 6/1999 | Payne et al. | |
| 5,930,786 A | 7/1999 | Carino, Jr. et al. | |
| 5,933,601 A | 8/1999 | Fanshier et al. | |
| 5,941,957 A | 8/1999 | Ingrassia, Jr. et al. | |
| 5,951,643 A | 9/1999 | Shelton et al. | |
| 5,951,652 A | 9/1999 | Ingrassia, Jr. et al. | |
| 5,954,798 A | 9/1999 | Shelton et al. | |
| 5,991,791 A | 11/1999 | Siefert | |
| 6,006,228 A | 12/1999 | McCollum et al. | |
| 6,026,403 A | 2/2000 | Siefert | |
| 6,035,332 A | 3/2000 | Ingrassia, Jr. et al. | |
| 6,085,223 A | 7/2000 | Carino, Jr. et al. | |
| 6,151,584 A | 11/2000 | Papierniak et al. | |
| 6,151,601 A | 11/2000 | Papierniak et al. | |
| 6,169,997 B1 | 1/2001 | Papierniak et al. | |
| 6,182,097 B1 | 1/2001 | Hansen et al. | |
| 6,253,203 B1 | 6/2001 | O'Flaherty et al. | |
| 6,286,030 B1 | 9/2001 | Wenig | |
| 6,286,046 B1 | 9/2001 | Bryant | |
| 6,286,098 B1 | 9/2001 | Wenig | |
| 6,295,550 B1 | 9/2001 | Choung et al. | |
| 6,317,794 B1 | 11/2001 | Papierniak et al. | |
| 6,334,110 B1 | 12/2001 | Walter et al. | |
| 6,397,256 B1 | 5/2002 | Chan | |
| 6,418,439 B1 | 7/2002 | Papierniak et al. | |
| 6,480,855 B1 | 11/2002 | Siefert | |
| 6,489,980 B1 | 12/2002 | Scott et al. | |
| 6,502,086 B2 | 12/2002 | Pratt | |
| 6,519,600 B1 | 2/2003 | Siefert | |
| 6,651,072 B1 | 11/2003 | Carino, Jr. et al. | |
| 6,658,453 B1 | 12/2003 | Dattatri | |
| 6,671,687 B1 | 12/2003 | Pederson et al. | |
| 6,714,931 B1 | 3/2004 | Papierniak et al. | |
| 6,766,333 B1 * | 7/2004 | Wu et al. | 1/1 |
| 6,850,975 B1 | 2/2005 | Danneels et al. | |
| 6,877,007 B1 | 4/2005 | Hentzel et al. | |
| 7,076,495 B2 | 7/2006 | Dutta et al. | |
| 7,260,837 B2 | 8/2007 | Abraham et al. | |
| 7,272,639 B1 | 9/2007 | Levergood et al. | |
| 7,278,105 B1 | 10/2007 | Kitts | |
| 7,293,281 B1 | 11/2007 | Moran et al. | |
| 7,490,319 B2 | 2/2009 | Blackwell et al. | |
| 7,580,996 B1 | 8/2009 | Allan | |
| RE41,903 E | 10/2010 | Wenig | |
| 8,042,055 B2 * | 10/2011 | Wenig et al. | 715/763 |
| 8,127,000 B2 * | 2/2012 | Wenig et al. | 709/224 |
| 8,219,531 B2 | 7/2012 | Eagan et al. | |
| 8,335,848 B2 * | 12/2012 | Wenig et al. | 709/224 |
| 8,381,088 B2 | 2/2013 | Kikin-Gil et al. | |
| 8,533,532 B2 * | 9/2013 | Wenig et al. | 714/33 |
| 8,583,772 B2 * | 11/2013 | Wenig et al. | 709/223 |
| 2002/0049840 A1 | 4/2002 | Squire | |
| 2002/0056091 A1 | 5/2002 | Bala | |
| 2002/0065912 A1 | 5/2002 | Catchpole et al. | |
| 2002/0070953 A1 | 6/2002 | Barg et al. | |
| 2002/0083183 A1 * | 6/2002 | Pujare et al. | 709/231 |
| 2002/0112035 A1 | 8/2002 | Carey et al. | |
| 2002/0165954 A1 * | 11/2002 | Eshghi et al. | 709/224 |
| 2003/0005000 A1 * | 1/2003 | Landsman et al. | 707/513 |
| 2003/0023715 A1 | 1/2003 | Reiner et al. | |
| 2003/0128233 A1 | 7/2003 | Kasriel | |
| 2003/0145071 A1 | 7/2003 | Straut | |
| 2003/0154289 A1 | 8/2003 | Williamson et al. | |
| 2004/0019675 A1 | 1/2004 | Hebeler | |
| 2004/0059809 A1 | 3/2004 | Benedikt et al. | |
| 2004/0059997 A1 | 3/2004 | Allen et al. | |
| 2004/0078464 A1 | 4/2004 | Rajan et al. | |
| 2004/0100507 A1 | 5/2004 | Hayner et al. | |
| 2004/0158574 A1 | 8/2004 | Tom et al. | |
| 2005/0021713 A1 | 1/2005 | Dugan et al. | |
| 2005/0030966 A1 | 2/2005 | Cai et al. | |
| 2005/0033803 A1 | 2/2005 | Vleet et al. | |
| 2005/0066037 A1 | 3/2005 | Song et al. | |
| 2005/0071464 A1 | 3/2005 | Kuwata et al. | |
| 2005/0086606 A1 | 4/2005 | Blennerhassett et al. | |
| 2005/0188080 A1 | 8/2005 | Motsinger et al. | |
| 2005/0246651 A1 | 11/2005 | Krzanowski | |
| 2005/0278565 A1 * | 12/2005 | Frattura et al. | 714/5 |
| 2006/0048214 A1 | 3/2006 | Pennington et al. | |
| 2006/0075088 A1 | 4/2006 | Guo | |
| 2006/0117055 A1 | 6/2006 | Doyle | |
| 2006/0123340 A1 | 6/2006 | Bailey et al. | |
| 2006/0162071 A1 | 7/2006 | Dixon et al. | |
| 2007/0106692 A1 * | 5/2007 | Klein | 707/104.1 |
| 2007/0226314 A1 | 9/2007 | Eick | |
| 2007/0245249 A1 * | 10/2007 | Weisberg | 715/758 |
| 2007/0255754 A1 | 11/2007 | Gheel | |
| 2008/0005661 A1 | 1/2008 | Yao et al. | |
| 2008/0005793 A1 * | 1/2008 | Wenig et al. | 726/22 |
| 2008/0034036 A1 * | 2/2008 | Takeshima et al. | 709/203 |
| 2008/0046562 A1 | 2/2008 | Butler | |
| 2008/0052377 A1 * | 2/2008 | Light | 709/218 |
| 2008/0127217 A1 * | 5/2008 | Wang | 719/318 |
| 2008/0184129 A1 | 7/2008 | Cancel et al. | |
| 2008/0216094 A1 | 9/2008 | Anderson | |
| 2008/0294974 A1 | 11/2008 | Nurmi et al. | |
| 2009/0013347 A1 | 1/2009 | Ahanger | |
| 2009/0019133 A1 | 1/2009 | Brimley | |
| 2009/0024930 A1 | 1/2009 | Kim | |
| 2009/0037517 A1 * | 2/2009 | Frei | 709/202 |
| 2009/0037914 A1 | 2/2009 | Chagoly et al. | |
| 2009/0063968 A1 | 3/2009 | Wenig | |
| 2009/0070869 A1 * | 3/2009 | Fan et al. | 726/22 |
| 2009/0083714 A1 | 3/2009 | Kiciman et al. | |
| 2009/0138554 A1 | 5/2009 | Longobardi et al. | |
| 2009/0228474 A1 | 9/2009 | Chiu et al. | |
| 2009/0247193 A1 | 10/2009 | Kalavade | |
| 2009/0254529 A1 | 10/2009 | Goldentouch | |
| 2010/0058285 A1 | 3/2010 | Meijer | |
| 2010/0070929 A1 | 3/2010 | Behl et al. | |
| 2010/0146380 A1 | 6/2010 | Rousso | |
| 2010/0211638 A1 | 8/2010 | Rougier | |
| 2010/0251128 A1 | 9/2010 | Cordasco | |
| 2010/0287229 A1 | 11/2010 | Hauser | |
| 2010/0318507 A1 | 12/2010 | Grant et al. | |
| 2011/0029665 A1 | 2/2011 | Wenig et al. | |
| 2011/0320880 A1 | 12/2011 | Wenig | |
| 2012/0084437 A1 | 4/2012 | Wenig | |
| 2012/0102101 A1 | 4/2012 | Wenig | |
| 2012/0151329 A1 | 6/2012 | Cordasco | |
| 2012/0173966 A1 | 7/2012 | Wenig et al. | |
| 2013/0091417 A1 | 4/2013 | Cordasco | |
| 2013/0339143 A1 | 12/2013 | Wenig | |
| 2014/0108911 A1 | 4/2014 | Damale | |
| 2014/0115712 A1 | 4/2014 | Powell | |
| 2014/0137052 A1 | 5/2014 | Hernandez | |

FOREIGN PATENT DOCUMENTS

| | | |
|---|---|---|
| EP | 0326283 | 8/1989 |
| EP | 0843449 | 5/1998 |
| EP | 1097428 | 6/2002 |
| EP | 07840244.3 | 2/2008 |
| EP | 08769998.9 | 3/2009 |
| GB | 2357680 | 6/2008 |

(56) References Cited

FOREIGN PATENT DOCUMENTS

| WO | 9825372 | 6/1998 |
|---|---|---|
| WO | WO 98/26571 | 6/1998 |
| WO | 9836520 | 8/1998 |
| WO | 0013371 | 3/2000 |
| WO | 0217165 | 2/2002 |
| WO | 2008/019193 | 2/2008 |
| WO | 2009/029316 | 3/2009 |
| WO | 2010019258 | 2/2010 |

OTHER PUBLICATIONS

Rubio, An Introduction to JSON, Feb. 28, 2007, http://www.oracle.com/technetwork/articles/entarch/introduction-json-097942.html.*
Teare, An Introduction to Ajax, Aug. 2005, http://www.oracle.com/technetwork/articles/entarch/ajax-introduction-096831.html.*
Stolowitz Ford Cowger LLP, Listing of Related Cases May 3, 2012.
Written Opinion of the International Searching Authority; PCT/US11/35410; Date of mailing Dec. 14, 2011.
International Search Report for PCT/US11/35410; Date of mailing Dec. 14, 2011.
Smith et al., "Automated Protocol Analysis," Human Computer Interaction, 8:101-145, 1993.
Bishop, Matt et al., "A Model of Security Monitoring", Department of Mathematics and Computer Science, Dartmouth College, pp. 46-52.
Al-Qaimare G., et al., Kaldi: A Computer-Aided Usability Engineering Tool for Supporting Testing and Analysis of Human-Computer Interation:, Computer-Aided Design of User Interfaces. Proceedings of the International Conference on Computer-Aided Design of User Interfaces, Proceedings of CADUI, xx, xx, Oct. 21, 1999, pp. 337-355.
International Search Report for PCT/US08/65582; Date of Mailing Sep. 11, 2008.
International Search Report for PCT/US2007/071096; Date of mailing May 13, 2008.
Written Opinion of the International Searching Authority for PCT/US08/65582; Mailing date Sep. 11, 2008.
Written Opinion of the International Searching Authority for PCT/US07/71096; Mailing date May 13, 2008.
PCT Search Report for PCT/US2011/033813; Mailing Date Jul. 28, 2011.
Written Opinion of the International Searching Authority for PCT/US2011/033813; Mailing Date Jul. 28, 2011.
Stolowitz Ford Cowger Listing of Related Cases Mar. 15, 2012.
International Search Report for PCT/US09/04654; Date of mailing Oct. 2, 2009.
Written Opinion of the International Searching Authority; PCT/US09/04654; Date of mailing Oct. 2, 2009.
Holloway, et al., "Cryptographic Initialization Test", IBM Technical Dsiclsoure Bulletin, pp. 195-198, Feb. 1991.
Han et al., "Using Ajax for Desktop-;like Geospatial Web Application Development," Geoinformatics, 2009 17th International Conference on Aug. 12-14, 2009, <http://geobrain.laits.gmu.edu/geobrainhome/docs/GeOnAS_Ajax.pdf>.
Stolowitz Ford Cowger LLP; Listing of Related Cases; Aug. 27, 2012.
International Search Report for PCT/US12/25971; Date of mailing May 31, 2012.
Written Opinion of the International Searching Authority for PCT/US12/25971; Date of mailing May 31, 2012.
Bishop, Matt et al., "A Model of Security Monitoring", Department of Mathematics and Computer Science, Dartmouth College, pp. 46-52. Dec. 1989.
Peter Brusilovsky et. al., "Adaptive and Intelligent Web-based Educational Systems," International Journal of Artificial Intelligence in Education, Apr. 1, 2003, pp. 159-172, XP55039152, The Netherlands Retrieved from the Internet: URL: http://www.sis.pitt.edu/~peterb/papers/AIWBES.pdf [retrieved on Sep. 25, 2012] p. 160-161.
Atterer R et al. : "Knowing the User's Every Move—User Activity Tracking for Website Usability Evaluation and Implicit Interaction," WWW '06 Proceedings of the 15th World Wide Web, ACM, New York, NY, USA, May 22, 2006, pp. 203-212, XP002519605, DOI: 10.1145/1135777.1135811 ISBN 978-1-5959-323-2.
International Search Report for PCT/US2013/023636; Date of Mailing Aug. 13, 2013.
Written Opinion of the International Searching Authority for PCT/US2013/023636; Date of Mailing Aug. 13, 2013.
Reed Martin; Using Google Analytics Site Overlay; Community Spark; Apr. 13, 2007. Online: <http://www.community.com/using-google-analytics-site-overlay/>.
Stolowitz Ford Cowger LLP Listing of Related Cases May 14, 2013.
Communication from the EP Patent Office pursuant to Article 94(3) EPC in EP Application No. 09806979.2; dated Jan. 6, 2014.
Stolowitz Ford Cowger LLP; Listing of Related Cases; Dec. 19, 2013.
Summons to attend oral proceedings pursuant to Rule 115(1) in EP App. No. 07840244.3; Dated Dec. 12, 2013.

* cited by examiner

METHOD AND SYSTEM FOR COMMUNICATION BETWEEN A CLIENT SYSTEM AND A SERVER SYSTEM

TECHNICAL FIELD

Embodiments of the present invention relate to the field of client-server communications. More particularly, embodiments of the present invention relate to a method and system for passively monitoring network communication between a server and a client, and based thereon, communicating commands and data in a client-server interaction.

BACKGROUND ART

Web applications have become important business, entertainment and social tools. Commerce is conducted over the Internet via merchandise transactions, financial transactions, etc. Internet communication typically involves a client computer system, e.g., having a browser, communicating with a remote server system. The server system typically has installed thereon a web application program. The client system transmits page requests to the server system which responds with page responses to create a web experience for the client user. The requests and responses are called "network traffic."

Designers of web application programs would like to gain information about client experience including the client behavior and application behavior when interacting with a web application in order to better serve the client. In order to understand the manner in which users interact with a web application, prior art systems have been developed that are able to passively monitor and store the network traffic (without disturbing the web application program or the client) and further these passive systems can separate and store the data by sessions that are unique to a particular client. By analyzing the recorded network traffic, important client behavior may be understood. Also, by recording the network traffic by sessions, a specific client interaction can be replayed to an operator during a client telephone call in order to troubleshoot a web application program or determine how a client can be better assisted.

Unfortunately, it is not an easy task to modify a web application program to take advantage of information that may be obtained by passive monitoring and recording of the network traffic. Server based systems can be very complex and large. Many companies that run such servers resist frequent modification of them and their resident web application programs.

SUMMARY

Accordingly, a need exists for a system and method that can provide real-time user feedback (to enhance a user's web experience) based on passive monitoring of client-server network traffic without involving substantial modifications to the server system and without involving any substantial modifications to the resident web application program installed on the server system. A need exists for a system and method that can alter a web application's program flow, according to the user's perspective, in a manner that is transparent to the web application program. It will become apparent to those skilled in the art after reading the detailed description of the present invention that the embodiments of the present invention satisfy the above mentioned needs.

For instance, in response to passive monitoring of network traffic, a communication loop may be used to send specific commands and/or information to a client system to cause certain actions to take place on that client system, e.g., a chat window may be opened, a cookie value may be cleared, a document object model (DOM) of a browser may be altered, a session may be terminated, etc. The commands and/or information may originate from a system that is separate from the server system and whose operation does not substantially alter the server system or the web application program installed thereon.

By employing such a system and method, client actions in the context of the history of the user's current session can be used to provide personalized assistance, e.g., by opening a chat window, enhancing security by preventing click fraud, terminating an active session, clearing a cookie value, etc., in a manner that is transparent to the web application program.

More specifically, embodiments of the present invention are directed to a passive monitoring system that is separate from a server system. The passive monitoring system is able to monitor and record network traffic that includes client requests and server responses. The server responses originate from a web application program that is resident on the server system. The recorded network traffic is sessionized. The network traffic can be fed to a rules engine of the passive system which can use the network traffic to recognize when one or more user events occur.

In accordance with embodiments of the present invention, an agent is made operable on the client system by the server system. The agent operates within the client browser and collects various events occurring on the client system, generally referred to as document object model (DOM) events, e.g., mouse movements, mouse clicks, key strokes, the recorded delay between key strokes, etc. The agent, using an asynchronous communication channel, then posts the event data to the server, e.g., transmits the event data to the server system in an asynchronous fashion at prescribed time intervals. In response to the asynchronous post message, the client system expects to receive, and in fact listens for, an acknowledgement signal from the server system.

The passive monitoring system takes advantage of this acknowledgement signal requirement by providing, in addition to the acknowledgement signal, certain commands and/or data that may be generated by the rules engine in response to a recognized user event. These commands and/or data can then be conveniently sent asynchronously to the agent in order to alter the flow of the web based application. Since these commands originate from the passive system, and not the web server, the program flow of the web application is altered in a way that is transparent to the web application program on the server.

An advantage of the embodiments of the present invention is that the user experience of a web application can be augmented and improved (based on user interaction with the web application program) without requiring changes to the web application program on the server side aside from including the Javascript in the response page. The logic that determines if commands and/or data should be provided to the agent can be provided separate from the server based application program, e.g., integrated into a system designed to passively collect and monitor network traffic between the server system and client systems. The only change required of the server is that it place the agent with a page response.

More particularly, the passive monitoring system maintains a set of logical rules that are programmable. Application of the set of logical rules to the collected network traffic for a given client determines whether a prescribed event has occurred. In response to the determination, the passive monitoring system may generate a command signal for execution by the agent. Upon the next agent communication to the server, a command/data package may be generated and sent to the client system (alternatively, a mere acknowledgement signal may be sent if no commands are contemporaneously required).

The command/data package may cause the agent operating on the client system to take a certain action, e.g., open a chat window such that an operator can provide help to the user, alter a cookie value, terminate an active session between a browser of the client system and the web application, alter a DOM of a browser of the client system, etc. The agent can take almost any action in response to a command/data package.

Accordingly, events occurring on the client system may be understood by collecting and monitoring network traffic. As a result, the passive monitoring system may provide assistance to a client in real-time, e.g., by opening a chat window. Moreover, security may be enhanced by enabling the agent on the client system to take certain actions in real-time, e.g., terminate an active session, clear a cookie value, prevent click fraud, etc. Importantly, these actions may be taken without substantial alteration to the web application program.

In an alternative embodiment of the present invention, the rules engine of the passive monitoring system may also take into consideration, in addition to the recorded network traffic, the client information sent from the agent. In other words, in determining if an event occurred, the rules engine may, in one embodiment, consider both events communicated from the engine, and the recorded network traffic.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
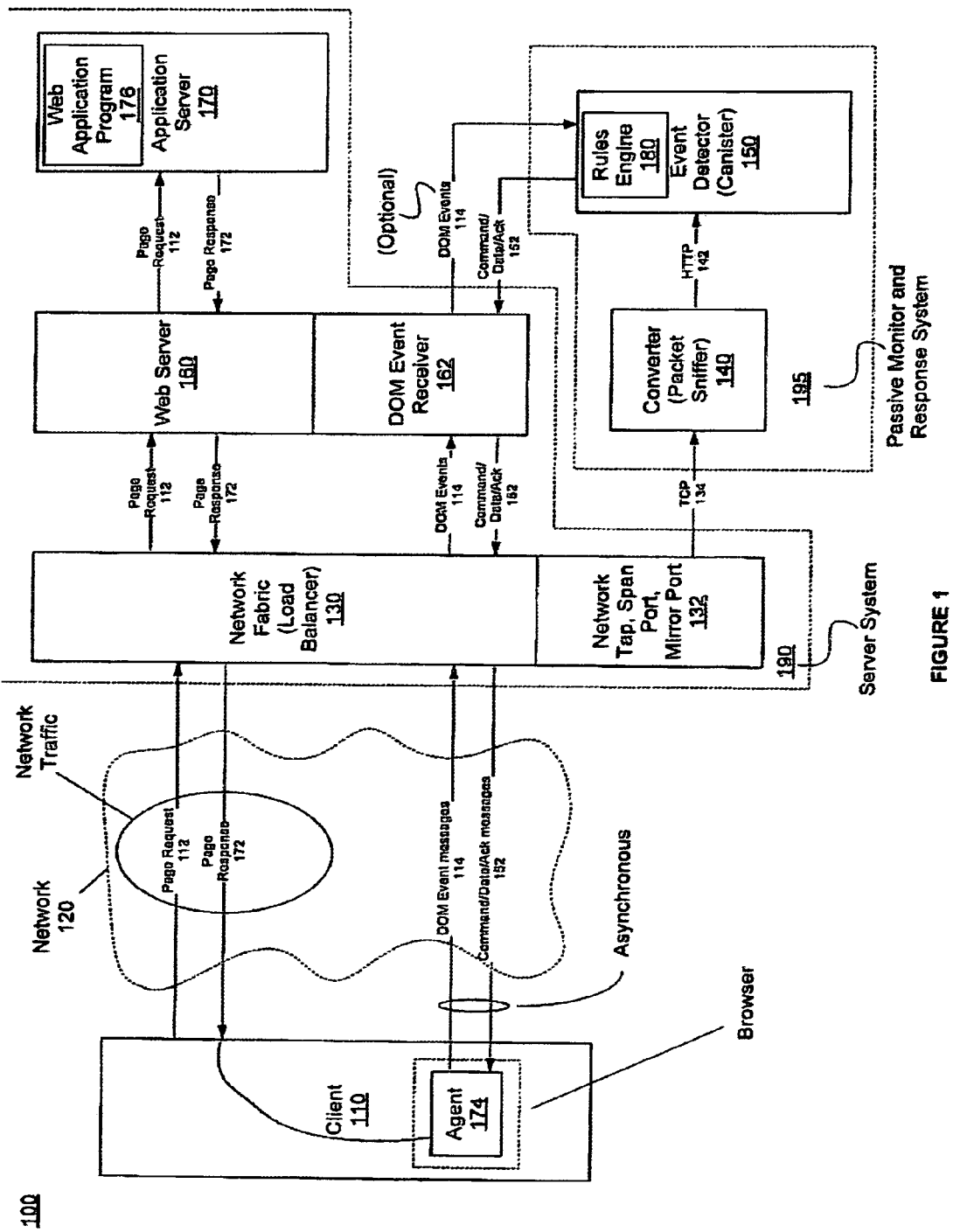
FIG. 1 shows an exemplary system diagram in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or "calculating" or "measuring" or "querying" or "responding" or "monitoring" or "storing" or "maintaining" or "sending" or "converting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and System for Communication Between a Client System and a Server System Referring now to FIG. 1, an exemplary system 100 diagram in accordance with one embodiment of the present invention is shown. The system 100 comprises a client computer system 110, a network 120, a server system 190 and a passive monitoring and response system ("passive system") 195. The passive system 195 may be located with or near the server system 190, or it may be located remote to the server system. The server system includes a network fabric component 130 which may be a load balancer and having a network tap 132. The network tap 132 may also be a span port or a mirror port. Herein, "tap" refers to a network tap, a span port and/or a mirror port. The server system also includes a web application program 176 resident on an application server 170. The server system may also include a web server system 160. The server system also includes a DOM event receiver 162. The DOM event message receiver 162 is operable to receive asynchronous DOM event messages 114 from the client 110. The web server 160 and the application server 170 may be referred to as an application tier.

It is appreciated that DOM events generally refer to events that change the DOM. However, "events" referred to herein are not limited to those events that change the DOM. For example, mouse movements, mouse clicks, key strokes, the recorded delay between key strokes, etc. may be DOM events. Moreover, an agent, e.g., a Javascript, operable on the user computer can generate events, e.g., posting event data to the server.

The passive system 195 is communicatively coupled with the server system 190. The passive system 195 includes a converter (packet sniffer) 140 and an event detector (canister) 150. The event detector 150 comprises a rules engine 180. The passive system 195 may monitor and record network traffic. Various methods for monitoring, capturing and encrypting the network traffic flow between the client system and the server system are described in U.S. Pat. Nos. 6,286,098 and 6,286,030, which are incorporated herein by reference in their entirety. Monitoring, synchronizing and replaying the captured network traffic between the client system and the server system are described in U.S. provisional patent application Nos. 60/806,443 and 60/969,537 which were filed on Jun. 30, 2006 and Aug. 31, 2007 respectively, are assigned to the assignee of the instant patent application and are incorporated herein by reference in their entirety. Provisional patent application No. 60/806,443 has been converted to U.S. Pat. No. 8,127,000, issued on Feb. 28, 2012, entitled: METHOD AND APPARATUS FOR MONITORING AND SYNCHRONIZING USER INTERFACE EVENTS WITH NETWORK DATA and is incorporated in its entirety by reference.

In one embodiment of the present invention, in operation, the client 110 can send a page request 112 to the server system 190. For example, the client 110 may request a particular webpage. The page request 112 travels through the network 120. The network fabric 130 receives the page request 112 and forwards the page request 112 to the web server 160 which in turn forwards the page request 112 to the application server 170. The network tap 132 forwards a copy of the page request 112 to the converter 140.

The server system 190 responds to the request by sending a page response 172. For instance, a web application program resident on the application server 170 responds by transmitting the page response 172. The page response 172 may comprise the requested webpage and the agent 174. The page response 172 is transmitted from the application server 170 to the web server 160 and thereafter to the network fabric 130. The network fabric 130 receives the page response 172 and forwards the page response 172 to the client 110 via the network 120. The network tap 132 forwards a copy of the page response 172 to the converter 140.

According to one embodiment, the page response 172 is a webpage along with an agent 174, e.g., a Javascript. The client 110 receives the page response 172 that includes the requested webpage along with the agent 174. The agent may be an AJAX (Asynchronous Javascript Execution) agent in one implementation. In one embodiment, the agent 174 may be loaded onto the webpage when transmitted. The agent 174 is operable within the client browser to monitor and collect various event data, e.g., document object model (DOM) events 114, occurring on the client 110 and is operable to send the event data to the server system 190. Event data is any action performed by the user that changes the DOM on the browser of the client 110. In one example, event data may comprise keyboard key presses, mouse clicks, mouse movements, a measure of delay in the user entering data in on-screen fields, data entered in the on-screen fields and interaction of an application with the requested webpage, etc.

Importantly, network traffic comprising requests 112 and responses 172 are monitored and collected by the passive system 195. It is appreciated that the network tap 132 supplies network traffic, e.g., page request 112 and page response 172, in a TCP format from the network fabric 130. The network traffic in TCP format 134 are transmitted to the converter (packet sniffer) 140. The converter converts the network traffic from TCP format into an HTTP/HTTPS format and sends the HTTP/HTTPS formatted network traffic 142 to the event detector (canister) 150. In other words, the converter 140 re-assembles packets such that requests and responses between the client 110 and the server system 190 can be recreated and replayed as webpages.

The HTTP/HTTPS formatted network traffic is stored and sessionized in the event detector 150 in accordance with a unique session established for the client 110. It is appreciated that each client may have its own corresponding session stored in the detector 150.

The passive system 195, via the rules engine 180, may determine whether a prescribed action or event has occurred, based on applying a programmable set of rules to the collected network traffic. As a result, an appropriate command, data and/or acknowledgement signal 152 ("command message") may be generated and transmitted to the client system 110. Importantly, the command message 152 is communicated in response to an asynchronous message received from the agent of the client system 110. In this sense, the command message is a "loop back" signal because it is sent responsive to the post signals 114 that originate from the agent 174. The command message 152 causes the agent 174 to take some action on the client side in real-time to alter or enhance the web application program flow in a way that is transparent to the web application program.

According to one embodiment, the agent 174 operating on the client 110 collects event data and communicates the collected event data asynchronously in discrete messages, e.g., DOM event messages 114, and at prescribed time intervals to the server system 190. For example, the agent 174 collects and sends DOM events 114 asynchronously via the network 120 to the network fabric 130. The network fabric 130 forwards the received DOM events 114 to the web server 160 wherein the DOM event receiver 162 receives and detects the DOM events 114. It is appreciated that the discrete messages sent by the agent could also be triggered based on a certain amount of detected events occurring rather than at prescribed time intervals, or a mixture of both may be used. While this event data may or may not be considered by the rules engine of the passive system, the communication is useful because it provides the passive system with an opportunity to communicate with the client system.

The DOM event messages 114 are forwarded to the event detector (canister) 150 of the passive system 195 by the DOM event receiver 162 in one embodiment. The DOM events 114, similar to the HTTP/HTTPS formatted network traffic, may optionally be stored in the event detector 150 in a sessionized fashion. For example, event data, e.g., DOM events 114, may be stored in accordance with a unique session established for the client 110. However, it is appreciated that the network traffic and/or the event data, e.g., DOM events 114, can be processed on the fly without a need to be stored. As will be discussed more fully below, the receipt of an asynchronous DOM event message 114 states the passive system 195 with a mechanism for communicating back to the client system 110 outside of the operation of the web application program 176 by using a command message 152.

Command messages are generated as a result of certain user actions being recognized by the passive system. A plurality of logical rules may be maintained and stored by the event detector 150. The plurality of logical rules may be user programmable and user configurable at the server side typically. The plurality of logical rules may be used by the rules engine 180 to identify specific user events and/or a prescribed action. For example, a plurality of logical rules may be used to determine (by operation of the passive system 195) whether the client 110 needs help or whether the client 110 should be disconnected for security reasons. In response to the determination, a variety of commands and/or data can be sent back to the agent indicating that a value of a cookie should be altered, an active session should be terminated, a chat window should be opened, a DOM of a browser on the client 110 should be altered, a window should be opened and a new uniform resource locator (URL) should be sent, etc.

The rules engine 180 of the event detector 150 applies the plurality of rules maintained in the event detector 150 to the received and stored HTTP/HTTPS formatted network traffic 142, and optionally, the DOM events 114. As a result, the rules engine 180 may generate a command message 152 which is transmitted in response to a received DOM event message 114. Message 152 may include a command, data and/or an acknowledgement signal to be generated. In other words, the rules engine 180 detects a compound event and by applying a set of prescribed rules, maintained in the event detector 150, to the received HTTP/HTTPS formatted network traffic (and optionally the received DOM events 114) for a given client. For example, based on the application of the logical rules, the rules engine 180 may determine that a chat window for the client 110 should be opened. In this case, in response to a received DOM event message 114 the acknowledgment package 152 will include commands and data to be executed by the agent 174 to open the chat window. Alternatively, if no commands and/or data is required, then message 152 will merely be an acknowledgement of the received DOM events from message 114.

The command signal 152 is transmitted from the event detector 150 to the DOM event receiver 162 and forwarded to the client 110 via the network 120. The signal 152 may be transmitted asynchronously and is always sent in response to a received DOM event message 114. Using this loop back communication scheme, the event detector 150 is operable to communicate commands, data and/or acknowledgement signal 152 to the DOM event receiver 162 responsive to identifying a specific user event. As such, the command, data and/or acknowledgment signal 152 is based on user actions of the client system 110 but is sent responsive to a received DOM event message 114. User actions are detected based on the stored network traffic and optionally may also be based on the received DOM events.

It is appreciated that in accordance with embodiments of the present invention the command message 152 may provide additional web content and functionality that is transparent to the operation of the web application. In other words, the actions taken by the agent 174 can alter the program flow of the web application from the user's perspective. But these alterations originate from the detector 150 and not from the web application program. Therefore, embodiments of the present invention provide a mechanism for passively monitoring network traffic and based thereon for altering the apparent flow of a web application at the client system without requiring any changes to the server based web application program. For instance, situations in which a user needs help can be detected and mechanisms can be communicated to the client for that help, all done in a manner that is transparent to the application program.

It is further appreciated that the event data 114 and command messages 152 are transmitted using an asynchronous channel created by the agent 174 while network traffic comprising page requests 112 and page responses 172 are transmitted using a channel different from the channel created by the agent 174. In either case, the stream of network traffic and event data (optionally including DOM event messages 114) are observed, sessionized and analyzed by the detector 150. Based on the analysis, an appropriate command signal 152 is transmitted via the created channel in order to alter the application flow at the client 110 and to provide additional web content and behavior based thereon, e.g., by opening a window, altering a cookie value, terminating an active session, etc. For instance, a chat window opened on the client 110 may allow a live operator to communicate with the user. The additional web content and functionality may be operable to cause the agent 174 to alter a DOM of a browser of the client 110. In one embodiment, the additional web content and functionality is operable to cause the agent 174 to terminate an active session between a browser of the client 110 and the web application. In one exemplary embodiment, the additional web content and functionality is operable to cause the agent 174 to alter a cookie value of the client browser, e.g., erase a cookie value, used by a browser of the client 110. The additional web content and functionality may also cause a window to open and display the contents of a specified URL at the client side. Thus, the user experience may be enhanced or terminated without substantial alteration of the web application program at the application server 170.

Figure 2:
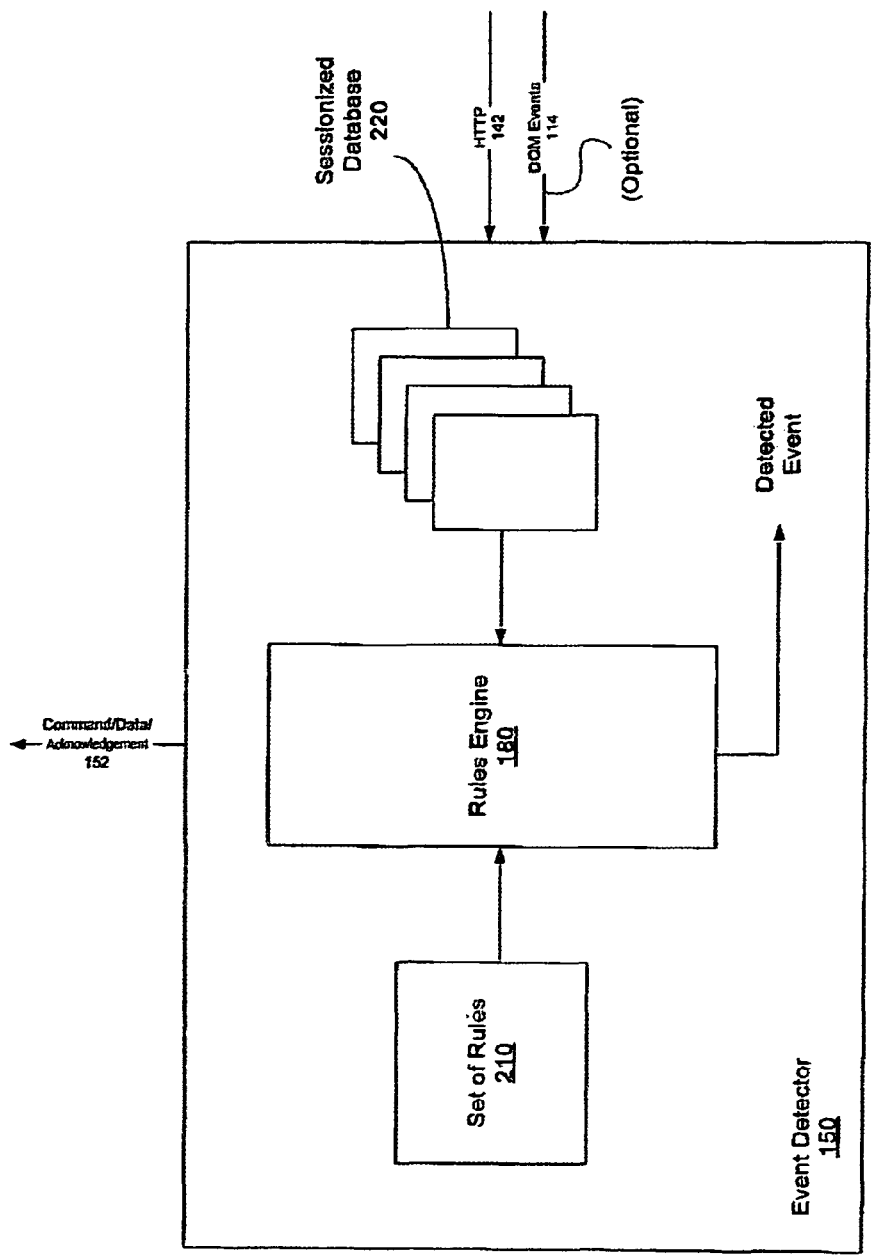
FIG. 2 shows an exemplary event detector of a passive system in accordance with one embodiment of the present invention.

Referring now to FIG. 2, an exemplary event detector 150 of the passive system 195 in accordance with one embodiment of the present invention is shown. According to one embodiment, the event detector 150 comprises the rules engine 180, a memory component for maintaining a set of rules 210 and a memory component for storing sessionized database 220 of page request and page responses.

The event detector 150 receives the HTTP/HTTPS formatted network traffic 142 from the converter unit 140. The received HTTP/HTTPS formatted network traffic 142 may be stored in a sessionized database 220 so that the HTTP/HTTPS formatted network traffic 142 may be stored in accordance with a unique session established for the client 110. Similarly, the received DOM events 114 may optionally be received and stored in the sessionized database 220. According to one alternative embodiment, the storing of the DOM events 114 may also be in accordance with a unique session established for the client 110.

A plurality of logical rules, e.g., Boolean expressions, may be maintained and stored in the set of rules memory component 210. The rules may be complex to determine compound events. It is appreciated that the plurality of logical rules maintained in the set of rules 210 may be programmable and user configurable by a server administrator. As presented and as discussed above, the plurality of logical rules may be used to determine whether a prescribed event has occurred at the client side. For example, the rules may be used to determine whether the client 110 needs help based on application of the rules to the monitored information, e.g., HTTP/HTTPS formatted network traffic 142 (and optionally DOM events 114). For instance, a set of rules may be defined for a user that enters all fields of an entry screen, but presses the "home" icon instead of the "accept" icon. A user exhibiting this behavior may need help completing the transaction. In this case, an operator window may be useful to the user. Alternatively, rules can be established to detect click fraud or other security risks. In such case, the client session can be terminated.

The rules engine 180 applies the rules maintained in the set of rules 210 memory component to the sessionized database 220 in order to detect a prescribed event. For example, application of a set of rules to a sequence of events as stored by the sessionized database 220 may detect a prescribed event, e.g., detect that a user needs help. In response to detecting the prescribed event, the event detector 150 generates a command message 152 that may include a command, data and/or an acknowledgment signal. The generated signal 152 may be transmitted to the client 110 in response to a received DOM event message 114 in order to enhance the client's experience. For example, the command message 152 may cause the agent 174 operating on the client 110 to open a chat window, enabling a live operator to chat with the client 110 in order to resolve an issue encountered.

It is appreciated that in one embodiment the rules engine 180 may apply the logical rules to the HTTP/HTTPS formatted network traffic 142 (and optionally the DOM events 114) on the fly. In other words, the rules engine 180 may apply the logical rules without a need to store the HTTP/HTTPS formatted network traffic 142 and further without a need to store DOM events 114 in the sessionized database 220.

As presented and discussed above, the generated command message 152 may provide web content and functionality that is in addition to the requested web application. For example, the command message 152 signal may cause the agent 174 operating on the client 110 to open a chat window, clear a cookie value, terminate an active session, alter a DOM of a browser of the client 110, etc. It is appreciated that the command message 152 signal is transmitted to the client asynchronously and in response to the received DOM events 114. The message 152 is forwarded to the DOM event receiver 162. The DOM event receiver 162 forwards the command message 152 to the agent 174 in response to an asynchronous DOM event message 114.

Figure 3:
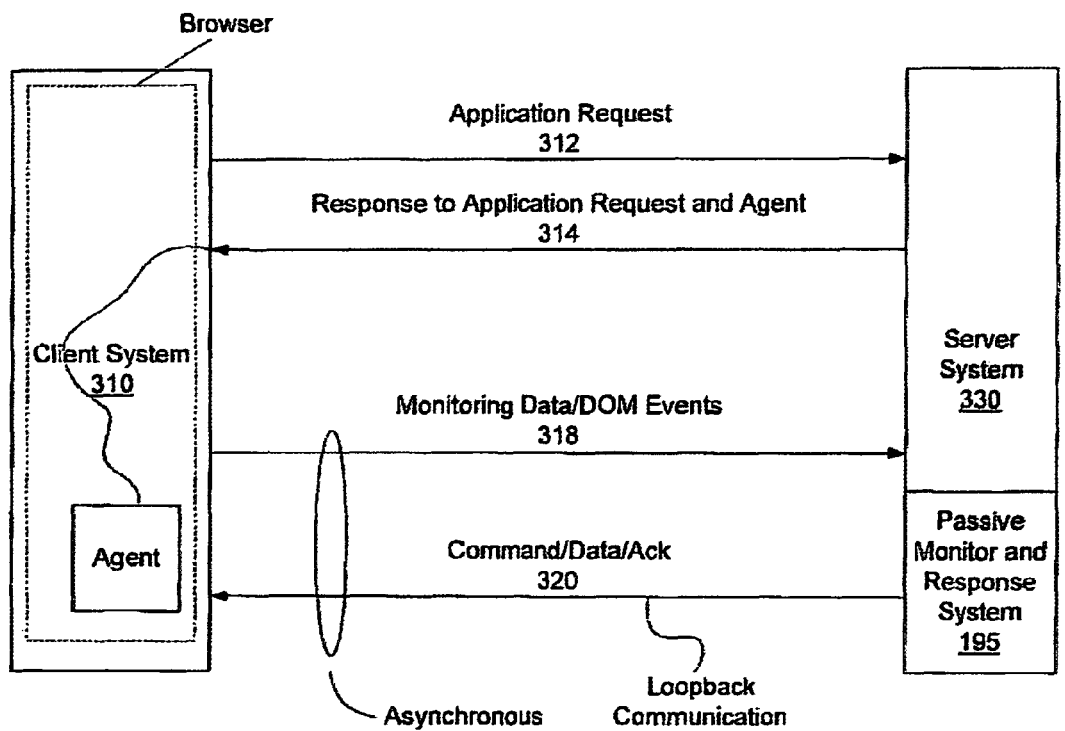
FIG. 3 shows an exemplary communication flow between a client system, the server system and the passive system in accordance with one embodiment of the present invention.

Referring now to FIG. 3, an exemplary communication flow 300 between a client system 310, the server system 330 and passive system 195 in accordance with one embodiment of the present invention is shown. According to one embodiment, a browser operating on the client system 310 may send an application request 312 to the server system 330. The application request 312 may be a request for a webpage, for example.

The server system 330 responds by sending a response 314 to the application request. The response 314 may comprise the actual requested application page along with a Javascript agent. The server system 330 may load the Javascript agent to the application prior to transmitting the response 314.

When the client system 310 receives the response, the requested web application, e.g., webpage, may be rendered by the client system 310. The received agent is then operable on the client system 310 for the requested web application, e.g., webpage.

The agent may collect and monitor various information on the client system 310 referred to as event data. Event data may comprise DOM events, as described above. The monitored data and/or DOM events 318 may be sent to the server system 330 asynchronously. It is appreciated that the server system 330 also collects network traffic information, e.g., requests 312 and responses 314. Based on the network traffic (and optionally on the monitored data and/or DOM events), the passive system 195 may detect a prescribed event. It is appreciated that a lack of event may also be an event, e.g., lack of an action within a prescribed time period.

Based on the prescribed event, the passive system 195 generates and transmits a command, data and/or acknowledgement signal 320 ("command message") to the client system 310 asynchronously and in response to a message 318. As presented above, the generated command message 320 transmitted to the client system 310 provides additional content and functionality that is transparent to the web application program of the server system 330. For example, the command may cause the agent operating on the client system 310 to open a chat window, alter a cookie value, terminate an active session, alter a DOM for the browser operating on the client system 310, etc. If no command and/or data is required, then command message 320 may merely be a simple acknowledgement of the latest DOM event message 318.

Referring now to FIGS. 4A, 4B, 4C and 4D, an exemplary sequence of events 400 observed on the client system in accordance with one embodiment of the present invention is shown. In this example, the client system 110 has requested a webpage for a particular bank in order to apply for a credit card. The server system 190 responsive to the request, sends the webpage to the client 110. Moreover, an agent is sent along with the webpage to the client.

The client browser receives the webpage and renders the webpage for the user. The webpage may comprise a plurality of fields and icons. For example, a first field 410 may be for the user's first name. A second field 420 may be for the user's last name. A third field 430 may be for a routing number for the user. A fourth field 440 may be an account number and the fifth field 450 may be the user's date of birth. A plurality of functional icons may also be provided. For example, a submit icon 460 may be used to submit the entered information. A cancel 470 icon may be used to cancel any transaction and a home icon 480 may be used to go to the home webpage effectively terminating any transaction before it is completed.

Figure 4A:
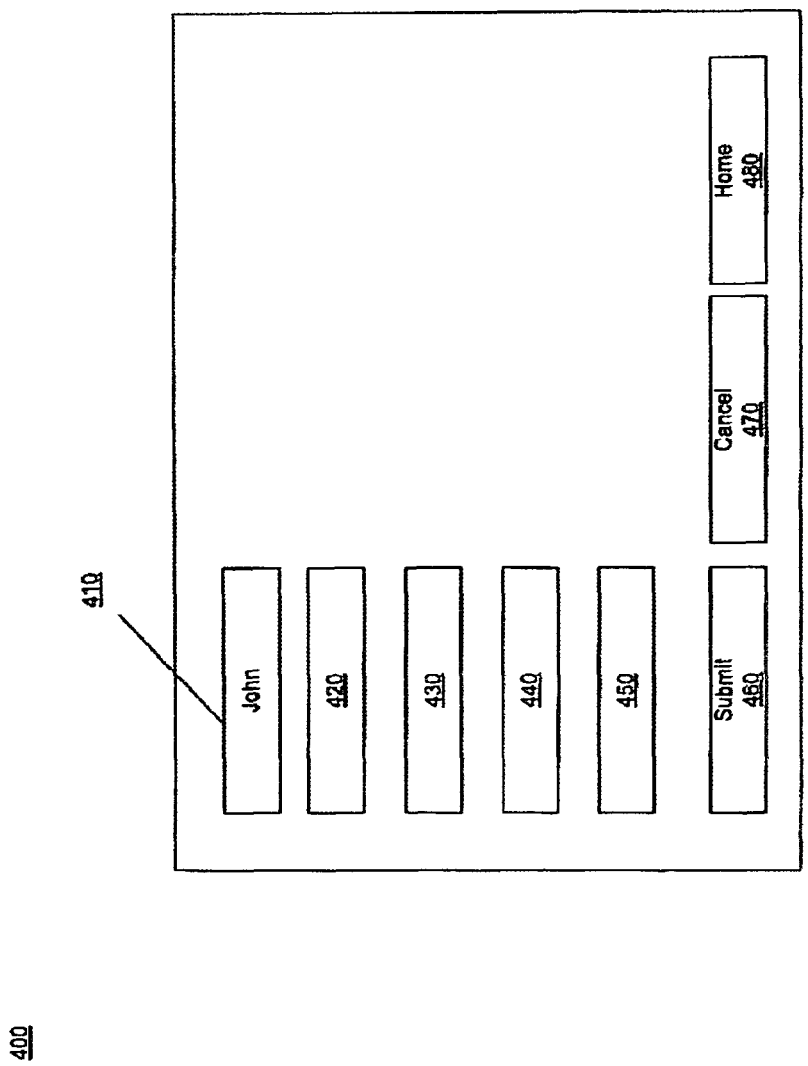
FIGS. 4A, 4B, 4C and 4D show an exemplary sequence of events observed on the client system in accordance with one embodiment of the present invention.
Figure 4B:
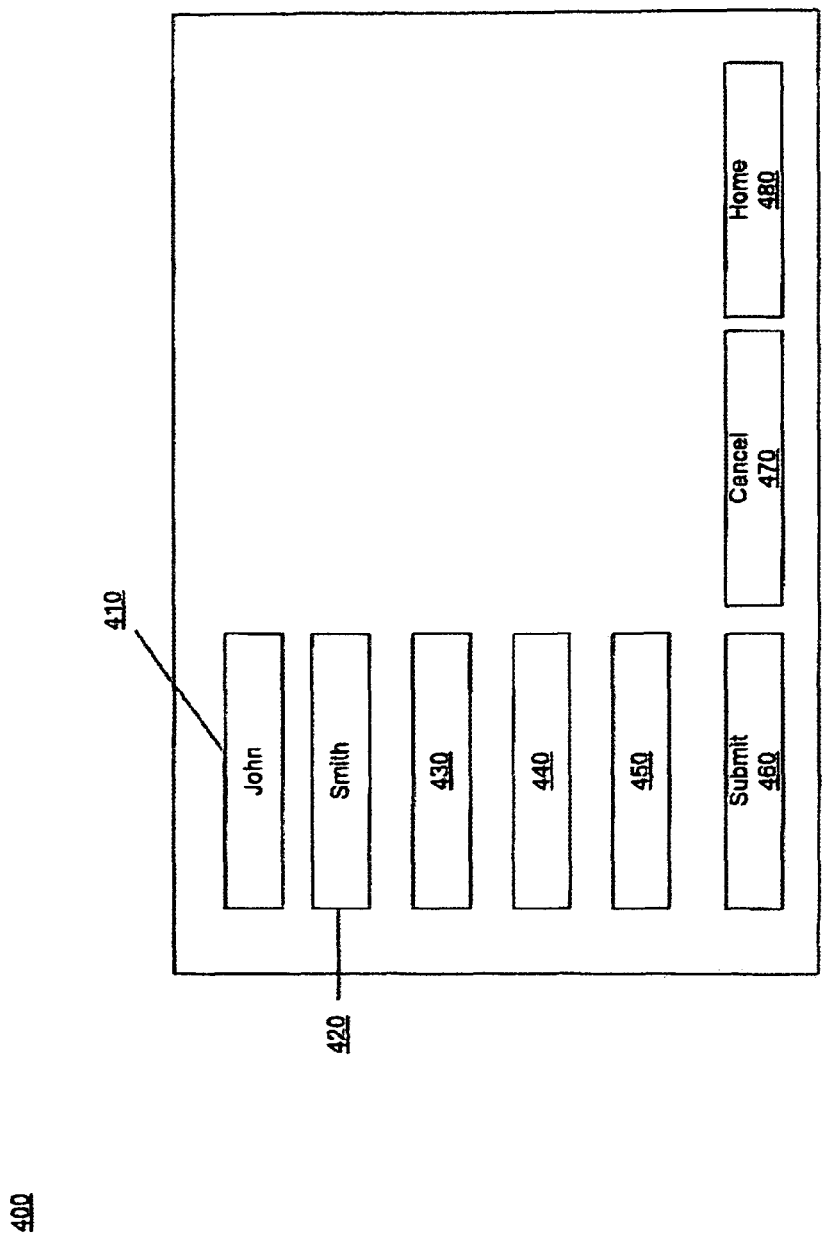
Figure 4C:
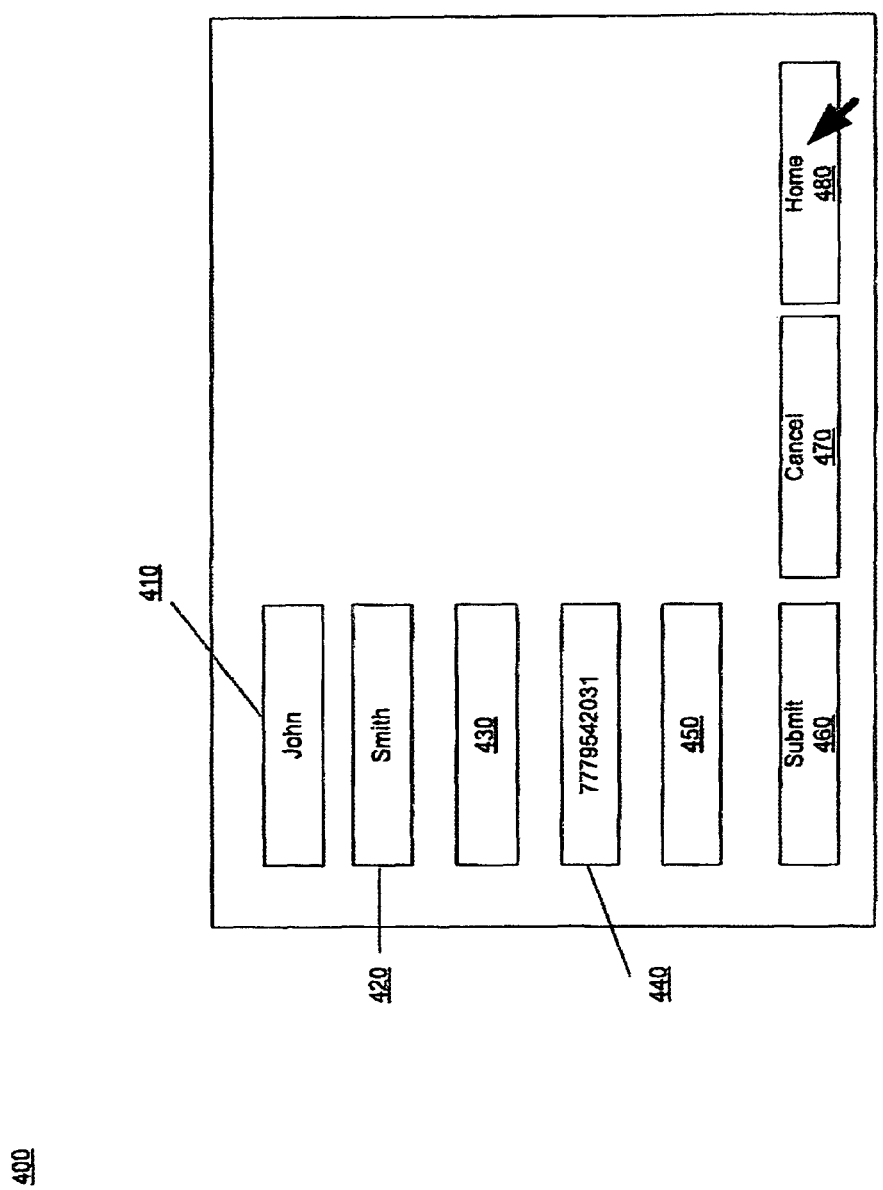

In FIG. 4A, the user begins by filling out the first name 410, e.g., typing "John." In FIG. 4B, the user continues to fill out the fields by filling out the last name 420, e.g., typing "Smith." The user may skip the third field and fill out the fourth field 440 for the account number, e.g., typing "7779542031," as shown in FIG. 4C. The user may proceed by requesting to go to a home webpage by pressing on the HOME icon 480.

It is appreciated that the agent operable on the client 110 monitors, collects and transmits the sequence of events occurring on the client 110 in between page requests. For example, the sequence of events that the third field 430 was skipped may be transmitted to the server system 190 as event data, e.g., DOM events 114. Moreover, other event data may include delays between key strokes, mouse movements, mouse clicks, delays between key strokes, overall delay, etc., may similarly be monitored, collected and sent to the server system 190 as DOM events 114. While this event data may or may not be considered by the rules engine of the passive system, it does provide the passive system with an opportunity to communicate with the client system.

The passive system 195 may identify a prescribed action based on the sequence of events, e.g., DOM events 114, collected from the client 110 and the collected network traffic information. For example, if the home button 480 is pressed without the user filling out the required fields, the server system 190 by applying the logical rules to the network traffic may determine that the user is lost and may need help. As a result, the passive system 195 may generate a command signal 152 and transmit it to the client 110 in response to the next DOM event message 114.

Figure 4D:
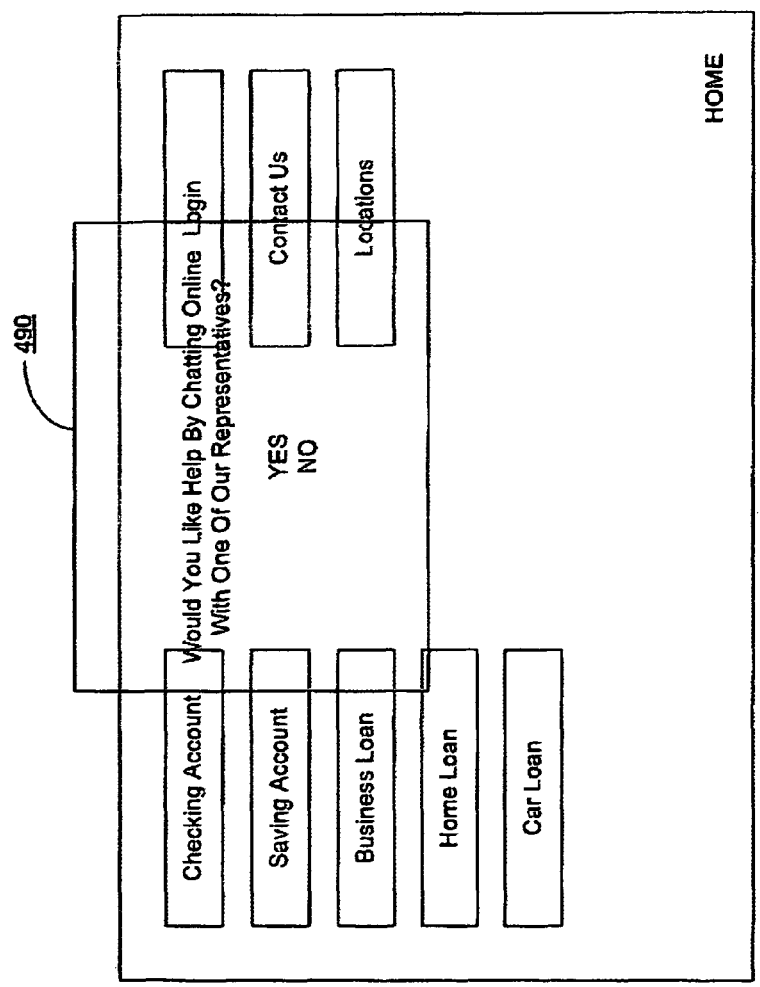

The generated command signal 152 may cause the agent operating on the client 110 to provide content in addition to the webpage rendered and/or to perform a particular action. For example, when the passive system 195 identifies that the user is lost and may need help, the home webpage may be rendered on the client 110 since that was the last action taken by the user, as shown in FIG. 4D. However, the command 152 may cause the agent to open a chat window 490 (transparent to the web application program) asking the user whether the user would like some additional help by connecting the user to an operator. Window 490 is transparent to the operation of the web application program and as such it does not originate from the web application program. It is appreciated that additional help may automatically be provided to the user by connecting the user to an operator in a separate window without prompting the user whether the user needs help. The user may choose to connect or reject. Thus, the original application, e.g., original webpage, is not altered but rather additional content, help, etc., is provided to enhance user's experience.

In one embodiment, when the user chooses to connect to an operator, the information entered by the user, e.g., DOM events 114 and the recorded network traffic information for this session may be transferred to the operator such that the operator can better assist the user. Moreover, it is appreciated that the command, data and/or acknowledgment 152 signal may cause the agent to perform other actions. For example, the command may cause the agent to alter a cookie value, open a chat window, send a new URL to the client in a new window, terminate an active session, alter a DOM of a browser of the client 110, etc. As a result, the user experience is enhanced, e.g., the program flow from the user point of view is altered, without substantial alteration to the original web application, e.g., the webpage.

Figure 5:
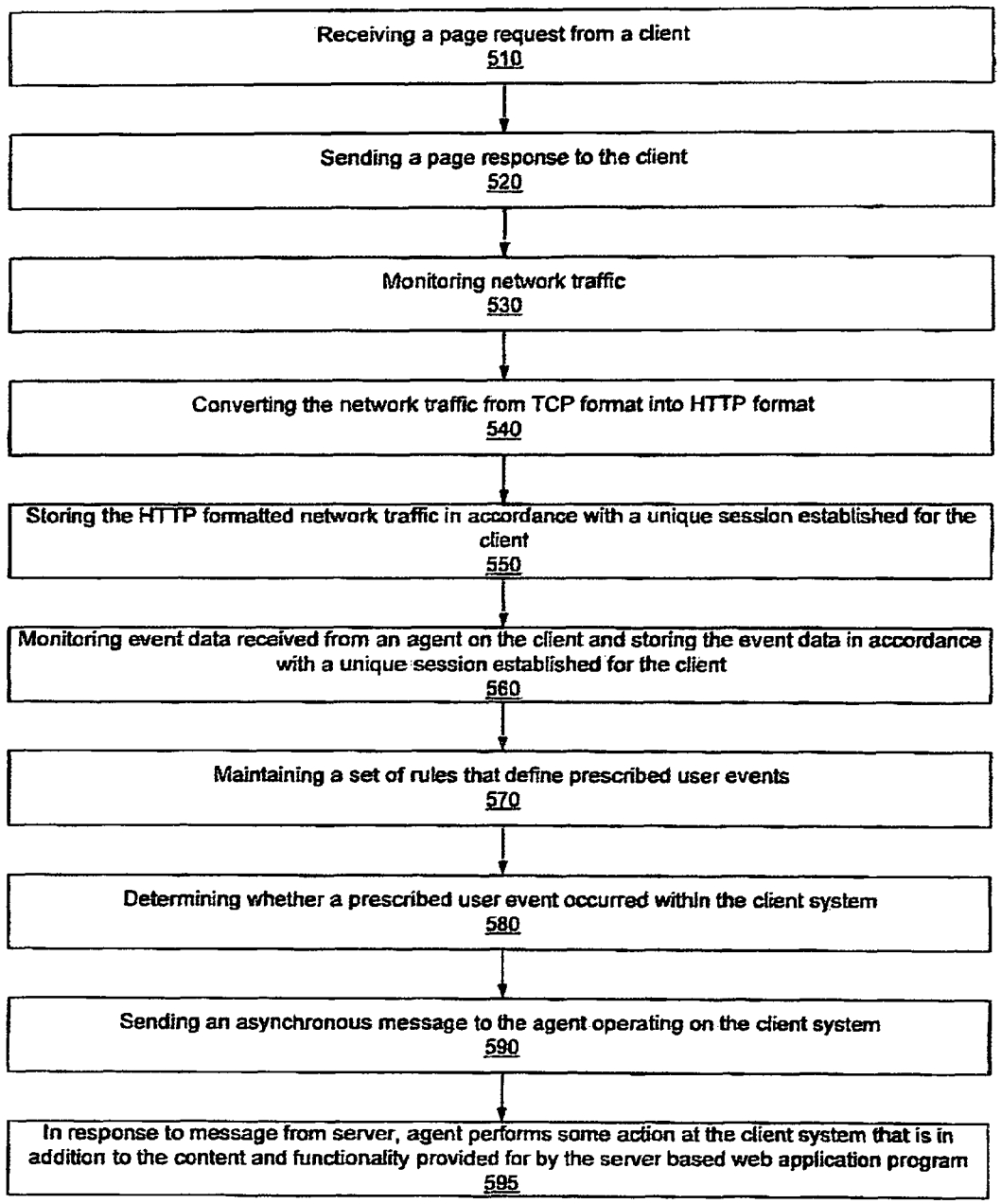
FIG. 5 shows an exemplary flow diagram in accordance with one embodiment of the present invention.

Referring now to FIG. 5, an exemplary computer controlled flow diagram 500 in accordance with one embodiment of the present invention is shown. At step 510, a page request 112 from the client 110 is received at the application tier. For example, the page request 112 may be a request for a particular webpage. At step 520, in response to the request 112, the server system 190 responds by sending a page response 172 to the client 110. The page response 172 may comprise the requested webpage and along with the agent 174 that has been loaded onto the webpage by the server system 190.

At step 530, the passive system 195 monitors the network traffic that comprises page requests and page responses. The page requests and page responses may be in TCP format. As such, at step 540, the passive system 195 converts the network traffic from TCP format into HTTP/HTTPS format. In other words, the user's request and responses may be reassembled by converting the TCP format into the HTTP/HTTPS format in order to replay the user experience.

It is appreciated that in one embodiment at step 550, the HTTP/HTTPS formatted network traffic may be stored in accordance with a unique session established for the client 110. Each client may have a unique session and the network traffic for each client may be stored in its corresponding session.

When the response is sent to the client, the agent 174, e.g. a Javascript, begins operating on the browser of the client 110 for the requested webpage. Thus, the agent 174 begins monitoring and collecting event data, e.g., DOM events. According to one embodiment, event data may comprise data regarding any events that occur on the client 110 that alter the DOM maintained on the browser of the client 110. In one example, event data may comprise keyboard key presses, mouse clicks, mouse movements, the recorded delay in key strokes when the user is entering data in on-screen fields, the data entered in the on-screen fields and interaction of an application with the requested webpage, etc. While this event data may or may not be considered by the rules engine of the passive system, it does provide the passive system with an opportunity to communicate with the client system.

Event data, e.g., DOM events, collected and monitored by the agent 174 are sent to the server system 190 in an asynchronous manner. In other words, the event data may be communicated to the server system 190 asynchronously in discrete messages based on prescribed conditions or intervals. It is appreciated that the event data may be communicated from the agent at prescribed intervals that may be user programmable. As such, at step 560, event data is monitored as it is received from the agent operating on the client. It is appreciated that the received event data may also be stored in accordance with a unique session established for the client 110.

At step 570, the passive system 195 maintains a set of rules that define prescribed user events that may need alteration. It is appreciated that the set of rules may be user programmable and user configurable. At step 580, the set of rules may be applied to the received network traffic and/or optionally to the event data to determine whether a prescribed user event has occurred within the client system 110. For example, based on the application of the logical rules to the received network traffic and the received event data, it may be determined that the user needs help. As such, based on the determination an appropriate command, data and/or acknowledgement signal may be generated.

At step 590, the command message is sent to the agent operating on the client 110. It is appreciated that the command, data and/or acknowledgement signal is a message that is communicated asynchronously to the client responsive to the receipt of a message from the agent containing event data.

According to one embodiment, the asynchronous message comprises a command to be executed by the agent in order to provide web content and functionality that is in addition to the page responses sent to the client at step 595. Thus, the web application, e.g., webpage, is not altered. In one exemplary embodiment, the web content and functionality that is provided in addition to the page responses may cause the agent to open a chat window on the client 110 system. The web content and functionality may be operable to cause the agent to alter a DOM of a browser of the client 110, terminate an active session between a browser of the client 110 system and the web application, alter a cookie value, erase a cookie value, etc. Almost any action may be taken by the agent.

As a result, many events occurring on the client 110 are understood by collecting and analyzing network traffic and optionally event data. Thus, web applications may be augmented by providing assistance in real-time, e.g., by opening a chat window without altering the web application program at the server. Moreover, security may be enhanced by enabling the agent on the client 110 to take certain actions, e.g., terminate an active session, alter a cookie value, prevent click fraud, etc. Therefore, the user experience may be enhanced without substantial alteration to the web application program at the server.

General Purpose Computer System Platform

Figure 6:
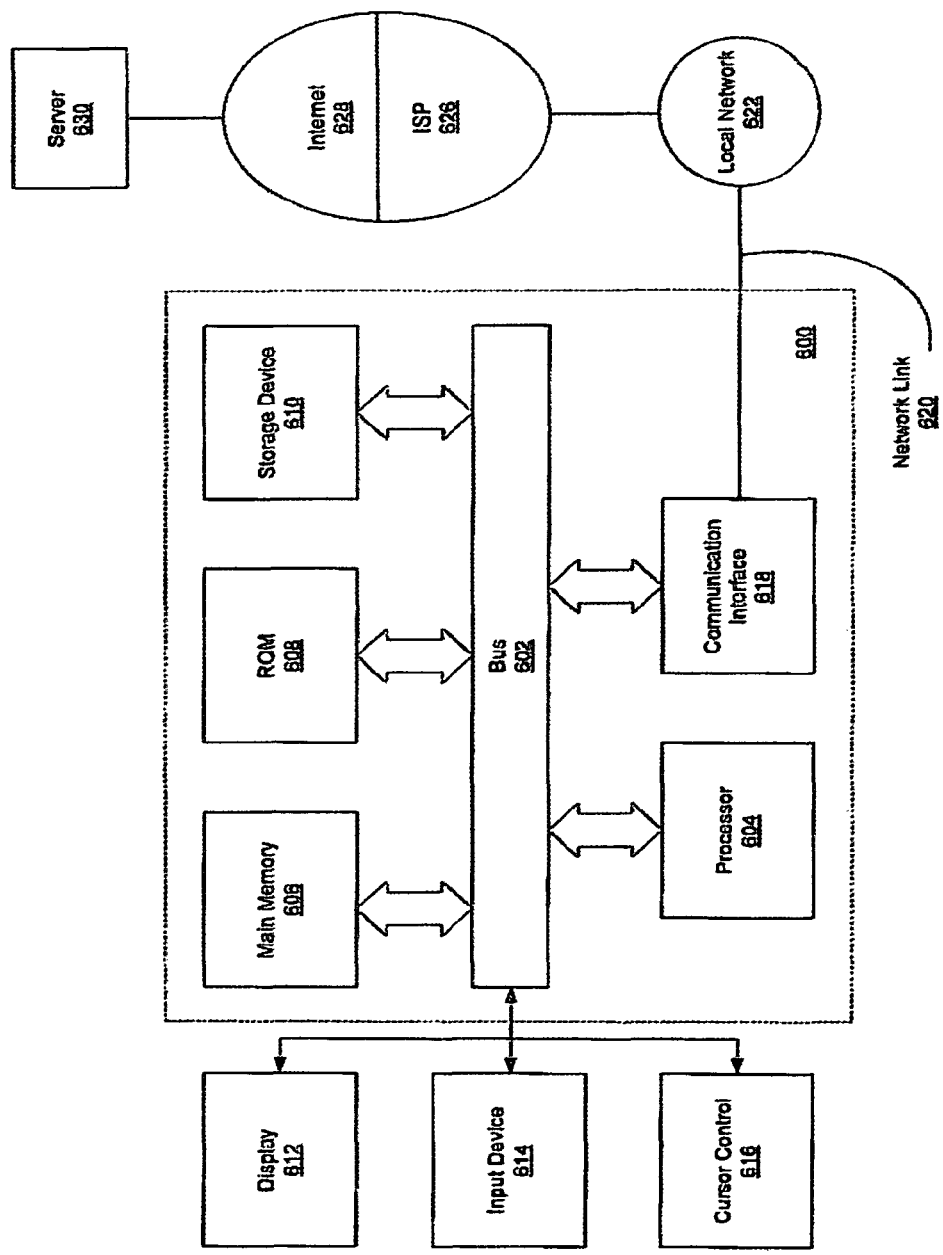
FIG. 6 illustrates a general purpose computer system that may serve as a platform for embodiments of the present invention.

FIG. 6 is a block diagram that illustrates a general purpose computer system 600 upon which embodiments of the invention may be implemented. Computer system 600 may be distributed, one at the client and one at the server to implement a method for a client and a server to communicate as shown in FIGS. 1-5 and includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A non-volatile storage device 610, such as a magnetic disk or optical disk, is provided and coupled to bus 602 for storing information and instructions and may store the persistent internal queue.

Computer system 600 may be coupled via bus 602 to an optional display 612, such as a cathode ray tube (CRT), a liquid crystal display (LCD), etc., for displaying information to a computer user. An optional input device 614, including alphanumeric and other keys, may be coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Computer system 600 can send and receive messages through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In summary, events occurring on the client system are understood by monitoring and collecting network traffic and optionally by monitoring asynchronously transmitted event data. In response to the monitored and collected data, a loop back communication channel may be used to provide assistance in real-time. Moreover, security may be enhanced by enabling the agent on the client system to take certain actions, e.g., terminate an active session, alter a cookie value, etc., to prevent click fraud, for instance. Since these agent actions take place outside the web application program, the user experience may be enhanced or changed without substantial alteration to the web application program.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   monitoring and storing network traffic communicated between a web application operating on a server system and a client system, the network traffic comprising page requests and page responses for a web session;
   monitoring and storing event data received separately from the network traffic from an agent operating within the client system, wherein the event data is transmitted in a separate communication channel from the network traffic;
   maintaining a set of rules;
   determining that a user event occurred within said client system based on a comparison of the set of rules with the network traffic from the web session; and
   sending a command message to the agent in response to determining the user event occurred within the client system, wherein the command message instructs the agent to open a new window with a new uniform resource locator (URL) independently of the page requests and the page responses for the web session.

2. The method of claim 1 wherein the agent is loaded into one of the page responses.

3. The method of claim 1 further comprising receiving the event data asynchronously from the network traffic.

4. The method of claim 1 wherein the event data comprises data regarding events occurring within the client system that alter a document object model (DOM) of a browser operating within the client system.

5. The method of claim 1, wherein the new window comprises a chat window.

6. The method of claim 1 wherein the event data comprises one or more of keyboard key presses, mouse clicks, mouse movements, a recorded delay in a user entering data in on-screen fields and/or data entered in the on-screen fields.

7. An apparatus, comprising:
   a processor;
   a memory;
   a monitor and response system configured to:
   receive and store webpage data comprising page requests and page responses from a first transmission channel, wherein the first transmission channel is used by a web application and a client device for conducting a web session;
   receive event data associated with the webpage data from an agent operating on the client device, wherein the event data is received over a second transmission channel;
   determine an action for operation on the client device based on comparing a set of rules to the webpage data received from the first transmission channel and the event data received from the second transmission channel; and
   send a command message to the agent over the second transmission channel, wherein the command message is configured to instruct the agent to open a chat window on the client device.

8. The apparatus of claim 7, wherein the monitor and response system comprises:
   a converter unit configured to receive the webpage data from the first transmission channel; and
   an event detector system configured to:
   receive the webpage data from the converter unit;
   receive the event data from the second transmission channel;

identify user events based on applying a set of prescribed rules to the webpage data and the event data; and send the command message to the agent over the second transmission channel based on the user events.

9. The apparatus of claim 8, wherein:

an application server is configured to operate the web application and transmit the webpage data over the first transmission channel in response to a page request from the client device;

a web server is configured to relay the page request from the client device to the application server and relay the webpage data from the web application to the client device;

a receiver is configured to operate on the web server;

the converter unit is configured to receive a copy of the webpage data from a network tap; and the event detector is configured to receive the copy of the webpage data from the converter unit, receive the event data from the receiver, and send the command message to the agent through the receiver.

10. The apparatus of claim 7, wherein the monitor and response system is further configured to:

receive the event data from the agent asynchronously from the web application; and send the command message in response to the event data asynchronously from the web application.

11. The apparatus of claim 7, wherein the command message is configured to initiate opening the chat window transparently from the web application.

12. The apparatus as described in claim 7, wherein the command message is further configured to cause the agent to alter a value of a cookie on the client device.

13. The apparatus of claim 7, wherein the command message is further configured to cause the agent to open a new window with a new uniform resource locator (URL).

14. A computer program product comprising a non-transitory computer readable medium having program code embodied wherewith, the program code readable/executable by a computer to perform a method comprising:

monitoring and storing network traffic for a web session between a web application and a client system, the network traffic comprising requests sent from the client system to the web application and webpage content received by the client system from the web application in response to the requests;

detecting user inputs associated with the webpage content;

sending event data to a monitor and response system in response to detecting the user inputs, wherein the event data is transmitted in a separate communication channel from the network traffic;

receiving a command message from the monitor and response system in response to sending the event data, wherein the command message is based on a comparison of the event data and the webpage content; and opening a new window with a new uniform resource locator (URL) based on the command message received from the monitor and response system.

15. The computer program product of claim 14, further comprising:

sending the event data to the monitor and response system independently of the requests sent from the client system; and receiving the command message back from the monitor and response system independently from the webpage content received from web application.

16. The computer program product of claim 14, further comprising opening the new window transparently from the web application.

17. The computer program product of claim 14, wherein the command message is based on a set of rules applied to the webpage content and the event data identifying a user event during the web session.

18. The computer program product of claim 14, wherein:

the requests and the webpage content are transmitted over a first transmission channel; and the event data and the command message are transmitted over a second transmission channel.

19. The computer program product of claim 14, further comprising sending the event data to the monitor and response system and receiving the command message back from the monitor and response system independently of the network traffic transmitted between the client system and the web application.

20. The computer program product of claim 14, wherein the new window comprises a chat window.

* * * * *